Sept. 12, 1933.    R. J. NORTON    1,926,699
FRICTION MATERIAL
Original Filed Feb. 27, 1929
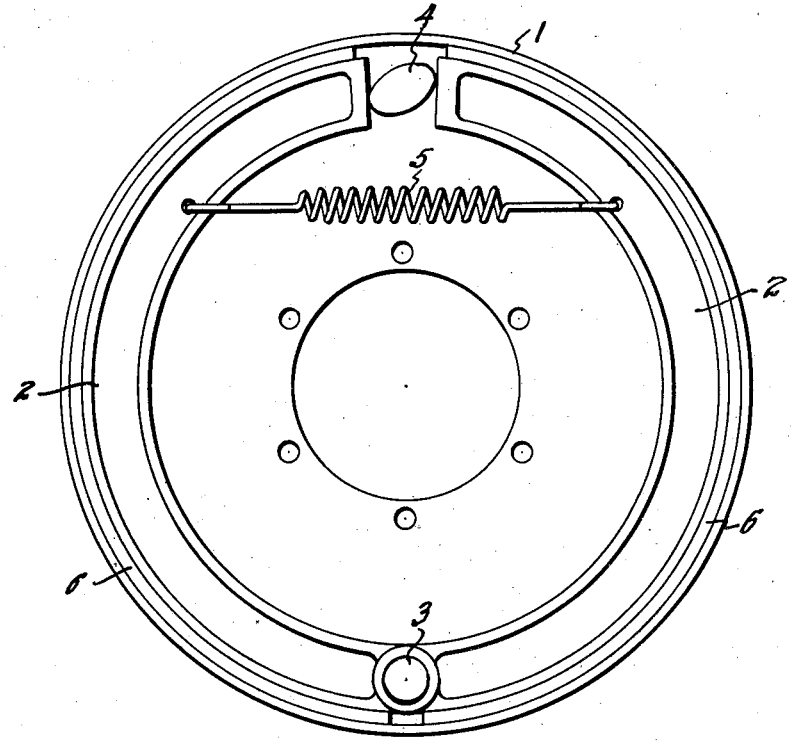
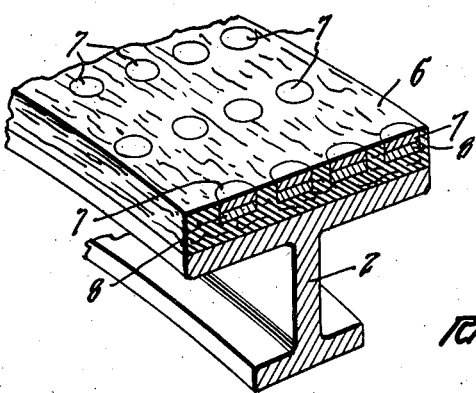
Inventor
Raymond J. Norton Patented Sept. 12, 1933

1,926,699

UNITED STATES PATENT OFFICE 1,926,699

FRICTION MATERIAL

Raymond J. Norton, Washington, D. C., assignor to Bendix Brake Company, South Bend, Ind., a corporation of Illinois Original application February 27, 1929, Serial No. 343,117. Divided and this application February 21, 1930. Serial No. 430,411

3 Claims. (Cl. 91—68)

This invention relates to improvements in friction materials and is a division of my copending application Serial No. 343,117, filed February 27, 1929.

As is known, the outstanding disadvantage of most types of brakes is their relative inefficiencies in wet weather. The reason for this appears to be that the friction material absorbs a considerable amount of water, becomes wet and loses its gripping force. This disadvantage has been noted by all drivers and is recognized as a relatively dangerous condition.

In the past, attempts have been made to minimize this disadvantage by mechanically protecting the friction material against the admission of water. This has been done by providing a minimal clearance between the rotating drum and the fixed backing plate so as to preclude the admission of water insofar as possible.

The purpose of the present invention is to provide a brake band which is, so to speak, inherently self-drying. The invention is effectuated by incorporating in the friction material, and preferably at a point remote from the friction engaging surface, a substance or substances which has an affinity for water greater than that of the fibrous material of the band. In operation any water which deposits on the friction material will be absorbed by the absorbing or drying substance and will leave the remainder of the material in a relatively dry state.

It will be appreciated, from the outline of the general method by which the desired results may be accomplished, that there is a relatively wide range of materials which may be used to attain the desired results. In order to clarify the invention there is shown in the accompanying drawing a diagrammatic illustration of the structure in which the invention is embodied.

Fig. 1 represents a conventionl form of brake of the internal expanding type.

Fig. 2 is an enlarged detail of the friction material which is mounted on the brake shoe.

In the drawing the usual brake structure is represented as comprising a brake drum 1 in which are mounted the cooperating shoes 2. These are pivoted at one end on the anchor pin 3 and on their opposite ends are expanded by a suitable expanding means such as a cam 4. The shoes are returned to inoperative position by a return spring 5. Each shoe 2, which may be of any desired type or form, has attached thereto a friction lining 6.

In the past, these linings have been made up of a woven or felted asbestos impregnated with a heavy asphaltic hydrocarbon which is hardened under heat and pressure. The present invention includes special treatment of the lining whereby this is made substantially self-drying by means of material which is incorporated in the facing. In accordance with the invention therefore, there is provided, a so to speak, anhydrous friction lining.

In one embodiment of the invention there is incorporated or embodied in the material of the lining a substance which has a decided affinity for water. For example, the lining may be impregnated with a water absorbent such as a gel, of the granular type. When such a material is employed it may be dispersed through the lining preferably in a zone removed from the frictional engaging surface or it may be localized or segregated by being deposited in the cusps 7.

For example, as shown, the friction material may be tapped to provide a plurality of recesses or hollows 7 of any desired size or shape. Preferably these extend substantially to the bottom of the friction material. Obviously it is within the scope of the invention to provide any type of interstitial or sponge-like structure within the apertures to form a mechanical retaining means for the gel. Similarly, if desired, the permanent retention of the gel in the friction material may be insured by means of an adhesive, such as a suitable gum incorporated with the gel. If desired, the adhesive and the mechanical retaining means may both be used.

It will be observed that when such a friction material is in operation, any water which finds its way to the face of the material will be taken up by the absorbent. If this material is suitably dispersed or disseminated through the friction material, and preferably at a point removed from the friction engaging surface, the water will be drawn away from the asbestos fibers near this surface and will be taken up in the absorbent.

It will be observed, at this point, that the dehydrating agent is substantially auto-revivifying. If the vehicle such as a plane or car is operating in wet weather, any water which enters the drum and is deposited on the friction material will be taken up by the absorbent by reason of its preferential affinity. As the brake is used the generated high heats of friction will drive off the water from the absorbing material. At the braking temperatures usually encountered under ordinary conditions this water will be dispelled in the form of vapor.

Since the fundamental concept of the invention is the use with a friction material of a substance which has a greater affinity for water than the fibers of the material, it will be appreciated that a number of granular or semi-solid gels may be used. A typical example of these is the commercial product known as silica gel. This material will take up or absorb approximately one-fifth of its own weight without any increase in volume.

This material, as explained, is self-revivifying. When the brake has been in use for an appreciable length of time the resultant frictional heats will drive the moisture out of the gel and restore it to its normal active state. In other words, the friction material, as prepared according to the present invention, provides for a complete cycle of water absorption and dissipation. It will be appreciated of course that silica gel is given merely as an example of the numerous other absorbing materials which may be employed. As is known, there are a number of metallic oxides which will absorb moisture in much the same manner as the silica gel.

If desired, other specific materials may be employed. For example, in lieu of the semi-solid or granular gels, one may employ inorganic salts which will take up water as water of constitution or crystallization. There are a large number of these substances which may be employed, the choice of which will be governed by such factors as availability, cost and the absorbing factor desired.

For example, if a low absorption factor is desired, a salt may be chosen which will take up only small quantities of water to form a mono or dihydrate; or again salts may be chosen which react with water to form a decahydrate. Here again it will be observed that the temperature which is reached in normal braking may be well above dissociation temperature of the hydrated salt so that the material is automatically rendered a potentially reactive dehydrating or water absorbing material.

As indicated above, the particular method of incorporating the drying agent in the friction material may be greatly varied. As shown in the drawing, it may be placed in receiving depressions or apertures in the brake bank, or it may be dispersed throughout the fibers of the band at any desired stage of the manufacture.

It is to be observed that in all of the modifications employed the absorbing materials, while taking up appreciable amounts of water, nevertheless remain in substantially the solid phase and hence do not impair the tensile properties of the friction facing. Since the drying agent is autogenously regenerated its time of utility is as extensive as that of the band itself if it be properly embodied therein.

While there has been described a number of different materials which may be utilized to effectuate the underlying principles of the invention, it is to be understood that these are given merely as examples of all similar materials which possess the property of preferential affinity for water as compared to the material of the brake band itself.

The invention is considered to reside broadly in the concept of embodying in or associating with the friction material a substance which will absorb water and withdraw it from the contact surface of the friction material to leave the latter in a relatively drier state.

I claim:

1. A friction facing comprising asbestos and silica gel.

2. A friction facing comprising a woven asbestos tape through which is dispersed a quantity of silica gel.

3. A brake lining comprising a friction material in which silica gel is embodied at segregated sections.

RAYMOND J. NORTON.